W. H. PERKINS.
HOSE NOZZLE.
APPLICATION FILED MAR. 23, 1908.
945,410.
Patented Jan. 4, 1910.
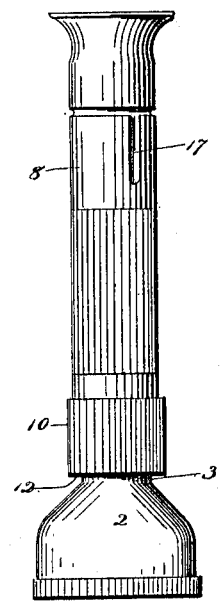
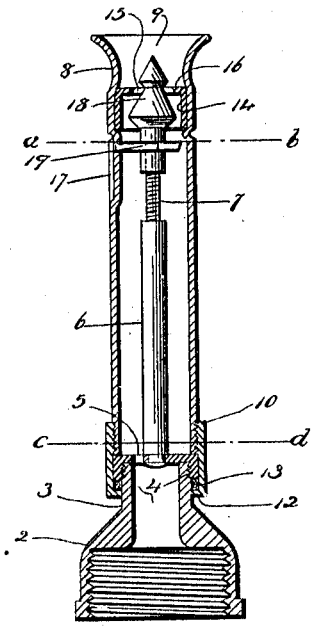
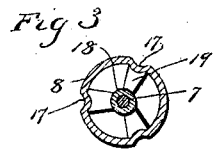
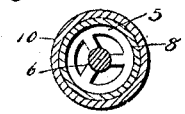
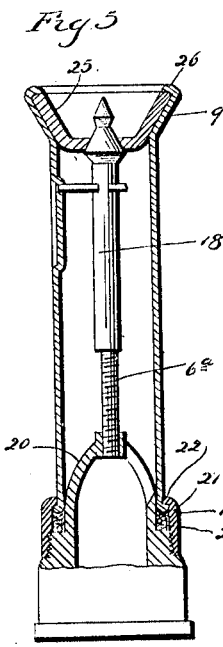
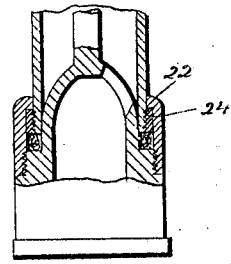

UNITED STATES PATENT OFFICE.

WALTER H. PERKINS, OF CHESHIRE, CONNECTICUT, ASSIGNOR TO THE WATERBURY MFG. CO., OF WATERBURY, CONNECTICUT, A CORPORATION.

HOSE-NOZZLE.

945,410.   Specification of Letters Patent.   Patented Jan. 4, 1910.

Application filed March 23, 1908. Serial No. 422,794.

*To all whom it may concern:*

Be it known that I, WALTER H. PERKINS, a citizen of the United States, residing at Cheshire, in the county of New Haven and State of Connecticut, have invented a new and useful Improvement in Hose-Nozzles; and I do hereby declare the following, when taken in connection with the accompanying drawings and the numerals of reference marked thereon, to be a full, clear, and exact description of the same, and which said drawings constitute part of this specification, and represent, in—

Figure 1 a side view of a hose nozzle constructed in accordance with my invention. Fig. 2 a longitudinal sectional view of the same. Fig. 3 a sectional view on the line *a—b* of Fig. 2. Fig. 4 a sectional view on the line *c—d* of Fig. 2. Fig. 5 a vertical section illustrating a modified form of the nozzle. Fig. 6 a sectional view of the lower end of the nozzle illustrating further modifications in the manner of connecting the shell with the head.

This invention relates to an improvement in that class of hose nozzles which are adapted to throw a stream of water or to convert it into a spray particularly to that class in which the spray is formed by moving a plug in the mouth of a nozzle so as to contract the same, the object of this invention being a simple arrangement of parts which permits the shell or barrel of the nozzle to be formed from sheet metal; and the invention consists in a hose nozzle having certain details of construction as will be hereinafter described and particularly recited in the claims.

In carrying out my invention as herein shown, I employ a head 2 which is adapted to be screwed to the male member of a hose coupling in the usual manner. This head is preferably cast and is provided with a neck 3 having external threads 4. Secured upon the neck 3 is a perforated cap 5 and extending outward therefrom is a spindle 6 formed at its outer end with screw threads 7.

The nozzle shell 8 is preferably made from a piece of tubing formed with a flaring mouth 9 and adapted at its inner end for connection with the head 2. As herein shown this connection is made by means of an intermediate collar or ring 10 which is of diameter to freely pass over the upper end of the head 2 and having its lower edge turned inward forming a flange 12. The outer end of this collar is internally threaded and the inner end of the tubing is threaded to be engaged therewith. In assembling the parts the collar or ring 10 is first placed over the neck 3 and a packing washer 13 introduced between the neck and the collar, the cap 5 carrying the spindle 6 is then turned onto the neck and the shell 8 turned into the upper end of the collar and connected therewith, threads forming a convenient means for making a joint. Within the outer end of the tube and near the mouth 9 thereof I locate a cup-shaped piece 14 having an opening 15 which forms a flange 16. In the sides of the tube I indent the metal to form longitudinal ribs 17 on the inside of the tube and preferably three of these ribs are provided. Mounted upon the threaded end of the spindle 6 is a plug 18 which has arms 19 corresponding in number to the number of ribs 17 and notched to engage therewith, and so that while the plug is free to move back and forth in the tube it is held against rotation. With this construction if the shell 8 be turned, it will turn the plug, and as the plug is threaded upon the threaded end of the spindle it moves outwardly or inwardly through the opening 15 according to the direction in which the sleeve is turned.

Instead of providing the cap 5 to support the spindle the head 2 may be formed with integral arms 20 in which the spindle may be riveted; or instead of riveting the spindle 6 to the head it may be formed integral with the arms 20 as shown in Fig. 6 of the drawings; and instead of making the spindle stationary and the plug movable thereof, the plug 18 may be formed with a threaded spindle 6ᵃ and adapted to be threaded into the support attached to or formed integral with the head, as shown in Fig. 5 of the drawings. By forming the support for the spindle integral with the head the shell may be coupled therewith in a variety of ways; thus as shown in Fig. 5 of the drawings, the collar or ring 10ᵃ is screwed to the head 2 and the inner end of the shell turned over to form a flange 21 with which a flange 22 of the ring may engage; a packing washer 23 being interposed between the end of the shell and the head. Instead of forming the shell with the flange 21 it may be threaded to receive a ring 24 which forms a shoulder for the engagement of the flange 22 of the ring.

Instead of employing a cup-shaped piece 14 as shown in Fig. 2 of the drawings, this cup may be inverted so that its flanges 25 may rest in the mouth 9, the edges 26 of which will be turned over the edges of the cup so as to hold it in place. This construction reinforces the outer end of the shell.

I thus provide a very simple arrangement of parts which move the plug as required to change the character of the stream discharged and which permits of the formation of the shell of the nozzle from sheet metal.

I claim:—

1. In a spray hose nozzle, the combination with a head forming a hose-connection or coupling-member, of a tubular sheet-metal shell the outer end of which is flared and the inner end of which has swivel-connection with the said head, a sheet-metal cup formed independently of the said shell and located within the outer end thereof, a valve-like plug formed with a taper and located within the outer end of the shell in position to coact with the said cup which forms a valve-seat for it, a spindle having fixed connection at its inner end with the said head and at its outer end having threaded connection with the said plug, and radial connection between the plug and the shell, whereby when the shell is rotated the plug is also rotated and moved longitudinally.

2. In a spray-hose nozzle, the combination with a head forming a hose-connection or coupling-member, of a tubular shell the outer end of which is flared and the inner end of which has swivel-connection with the said head, a perforated cap applied to the said head and located within the said shell, a threaded spindle connected at its inner end with the said cap, a valve-like plug connected with the outer end of the spindle and connected with the shell for rotation thereby, and a cup secured to the shell within the flared outer end thereof and coacting with the plug as a valve-seat.

3. In a spray hose-nozzle, the combination with a head forming a hose-connection or coupling-member, of a tubular shell the outer end of which is formed with longitudinal ribs and flared and the inner end of which has swivel-connection with the said head, of a valve-like plug located within the flared outer end of the shell and provided with radial arms coacting with the ribs for the rotation of the plug with the shell, a cup located within the outer end of the shell and coacting with the plug as a valve-seat, and threaded connection between the plug and the head so that when the plug is rotated with the shell it is moved longitudinally with respect to the said cup.

In testimony whereof, I have signed this specification in the presence of two subscribing witnesses.

WALTER H. PERKINS.

Witnesses:
ADOLPH C. RECKER,
LOUIS C. HOBART.